(12) United States Patent
Moore (10) Patent No.: US 10,239,195 B2
(45) Date of Patent: Mar. 26, 2019

(54) SYSTEM CONFIGURED TO COUPLE A HYDRAULIC HAMMER AND TOOL

(71) Applicant: Caterpillar Inc., Peoria, IL (US)

(72) Inventor: Cody Moore, Waco, TX (US)

(73) Assignee: Caterpillar Inc., Deerfield, IL (US)

( * ) Notice: Subject to any disclaimer, the term of this patent is extended or adjusted under 35 U.S.C. 154(b) by 661 days.

(21) Appl. No.: 14/943,206

(22) Filed: Nov. 17, 2015

(65) Prior Publication Data

US 2017/0136612 A1    May 18, 2017

(51) Int. Cl.
| | |
|---|---|
| *B25D 17/08* | (2006.01) |
| *B25D 17/02* | (2006.01) |
| *E02F 3/96* | (2006.01) |
| B22F 3/105 | (2006.01) |
| B33Y 80/00 | (2015.01) |
| B22F 5/10 | (2006.01) |
| B22F 5/00 | (2006.01) |
| B33Y 10/00 | (2015.01) |

(52) U.S. Cl.
CPC .......... *B25D 17/082* (2013.01); *B25D 17/02* (2013.01); *E02F 3/966* (2013.01); *B22F 3/1055* (2013.01); *B22F 5/10* (2013.01); *B22F 2005/001* (2013.01); *B22F 2005/005* (2013.01); *B22F 2207/20* (2013.01); *B33Y 10/00* (2014.12); *B33Y 80/00* (2014.12); *Y10T 29/49828* (2015.01)

(58) Field of Classification Search
CPC ....... B25D 17/082; B25D 17/02; E02F 3/966; B33Y 10/00; B33Y 80/00; B22F 2207/20; B22F 2005/005; B22F 2005/001; B22F 5/10; B22F 3/1055; Y10T 29/49828
See application file for complete search history.

(56) References Cited

U.S. PATENT DOCUMENTS

| | | | |
|---|---|---|---|
| 3,003,773 A | 10/1961 | Fuehrer | |
| 3,322,216 A * | 5/1967 | Kurt | .......................... E21B 4/06 173/132 |
| 4,858,701 A | 8/1989 | Weyer | |
| 5,065,827 A | 11/1991 | Meyers et al. | |
| 7,284,622 B2 | 10/2007 | Hahn | |
| 7,832,495 B2 | 11/2010 | Pillers, II | |

FOREIGN PATENT DOCUMENTS

| | | | |
|---|---|---|---|
| DE | 3308034 | 9/1984 | |
| EP | 0293327 | 11/1988 | |
| WO | 2015026905 A1 | 2/2015 | |
| WO | WO 2015176121 A1 * | 11/2015 | ........... E21B 17/076 |

* cited by examiner

*Primary Examiner* — Sarang Afzali
*Assistant Examiner* — Ruth G Hidalgo-Hernandez (57) ABSTRACT

A system configured to couple a hydraulic hammer and tool is disclosed. A hydraulic hammer may include a housing defining a chamber, elongate along a longitudinal axis, configured to receive a tool. The chamber may comprise an opening through which the tool may be inserted. A plurality of upper splines and a plurality of lower splines may be disposed, parallel to the longitudinal axis, on an inner surface of the chamber. A locking mechanism, comprising a rotatable locking ring, may be disposed within the chamber between the plurality of upper splines and the plurality of lower splines. The locking ring may comprise a plurality of locking ring splines disposed on an inner surface of the locking ring, wherein the plurality of locking ring splines are configured to align with the plurality of upper splines and the plurality of lower splines when the locking ring is rotated to an unlocked state.

14 Claims, 8 Drawing Sheets

SYSTEM CONFIGURED TO COUPLE A HYDRAULIC HAMMER AND TOOL

TECHNICAL FIELD

This disclosure relates generally to hydraulic hammer systems and more particularly to a system configured to couple a hydraulic hammer and a tool.

BACKGROUND

Heavy machines may be used to demolish tough material, such as concrete and rock. One example of such a heavy machine may include an excavator equipped with a hydraulic hammer assembly. The hydraulic hammer assembly may be attached at an end of a movable arm of the excavator and connected to the hydraulic system of the excavator. In a typical configuration, the hydraulic hammer assembly may include a hydraulic hammer and a work tool secured partially within the hydraulic hammer. The hydraulic hammer may include a reciprocating piston that is driven by high pressure fluid from the hydraulic system. The reciprocating piston may impact the work tool and the force of the reciprocating piston may be imparted to the material to be demolished via the work tool.

Since the work tool is the part of the hydraulic hammer assembly through which the impact forces of the hydraulic hammer are passed to the material, the work tool may experience significant wear. Accordingly, it may be necessary for the work tool to be efficiently replaced in situ at the worksite, possibly with limited access to other tools or equipment.

U.S. Pat. No. 4,858,701 to Weyer (the '701 patent) purports to provide one system of securing a tool within a hydraulic hammer. The '701 patent discloses a hammer with a lock collar positioned at the opening of the hammer. The lock collar is configured with longitudinally extending lock collar splines with a circumferential size and spacing corresponding to drive shaft splines situated in a drive shaft bore. When a tool shank fitted with tool shank splines is inserted into the drive shaft bore such that the tool shank splines mesh with the drive shaft splines, the lock collar may be rotated into a locked position in which the lock collar splines are misaligned with the drive shaft splines. Due to the exposed positioning of the lock collar at the opening of the hammer (i.e., the bottommost portion of the hammer) and the generally violent nature of hydraulic hammer demolition, the system disclosed in the '701 patent may suffer from poor durability. These and other shortcomings are addressed in the present disclosure.

SUMMARY

This disclosure relates to a system configured to couple a hydraulic hammer and tool. In one aspect, a hydraulic hammer may include: a housing defining a chamber, elongate along a longitudinal axis, configured to receive a tool, the chamber comprising an opening through which the tool is configured to be inserted; a plurality of upper splines disposed on an inner surface of the chamber, the plurality of upper splines longitudinally oriented parallel to the longitudinal axis; a plurality of lower splines disposed on the inner surface of the chamber, the plurality of lower splines longitudinally oriented parallel to the longitudinal axis; and a locking mechanism disposed within the chamber between the plurality of upper splines and the plurality of lower splines, the locking mechanism comprising a locking ring that is rotatable about the longitudinal axis with respect to the housing, the locking ring comprising a plurality of locking ring splines disposed on an inner surface of the locking ring, wherein the hydraulic hammer defines an unlocked state in which the plurality of locking ring splines are configured to align with both the plurality of upper splines and the plurality of lower splines.

In another aspect, an assembly configured to couple a hydraulic hammer and a tool may include: a chamber, elongate along a longitudinal axis, defined in a housing of the hydraulic hammer, the chamber comprising an opening through which the tool is configured to be inserted; a plurality of upper splines disposed on an inner surface of the chamber, the plurality of upper splines longitudinally oriented parallel to the longitudinal axis; a plurality of lower splines disposed on the inner surface of the chamber, the plurality of lower splines longitudinally oriented parallel to the longitudinal axis; and a locking mechanism disposed within the chamber between the plurality of upper splines and the plurality of lower splines, the locking mechanism comprising a rotatable locking ring, the locking ring comprising a plurality of locking ring splines disposed on an inner surface of the locking ring, wherein the plurality of locking ring splines are configured to align with the plurality of chamber splines when the locking ring is rotated to an unlocked state.

In yet another aspect, a method of coupling a tool and a hydraulic hammer may include: inserting the tool in a chamber, elongate along a longitudinal axis, defined by a housing of the hydraulic hammer; interconnecting a plurality of grooves defined in the tool with a plurality of upper splines disposed on an inner surface of the chamber, the plurality of upper splines longitudinally oriented parallel to the longitudinal axis; interconnecting the plurality of grooves with a plurality of lower splines disposed on the inner surface of the chamber, the plurality of lower splines longitudinally oriented parallel to the longitudinal axis; and interconnecting the plurality of grooves with a plurality of locking ring splines disposed on an inner surface of a rotatable locking ring, the locking ring disposed in the chamber between the plurality of upper splines and the plurality of lower splines; and rotating the locking ring to a locked position in which the plurality of locking ring splines are misaligned with the plurality of upper splines and the plurality of lower splines.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Figure 1:
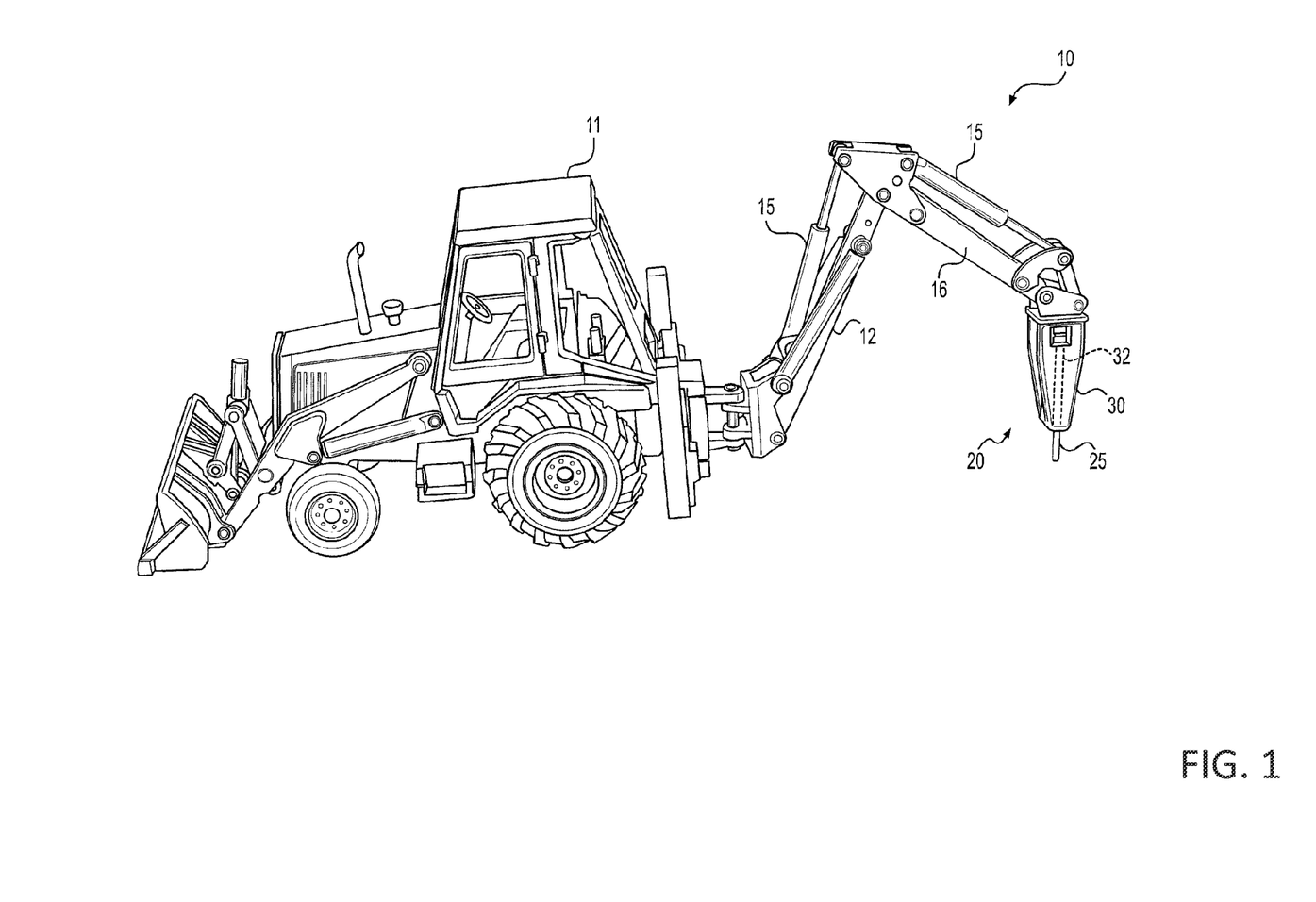
FIG. 1 illustrates an exemplary machine in accordance with aspects of the disclosure.

FIG. 1 illustrates an exemplary disclosed machine 10 having a hammer assembly 20. The machine 10 may be configured to perform work associated with a particular industry such as, for example, mining or construction. For example, the machine 10 may be a backhoe loader (shown in FIG. 1), an excavator, a skid steer loader, or any other machine. The hammer assembly 20 may be pivotally connected to the machine 10 through a boom 12 and a stick 16. It is contemplated that another linkage arrangement may alternatively be utilized, if desired.

In the disclosed embodiment, one or more hydraulic cylinders 15 may raise, lower, and/or swing the boom 12 and the stick 16 to correspondingly raise, lower, and/or swing the hammer assembly 20. The hydraulic cylinders 15 may be connected to a hydraulic supply system (not shown) within the machine 10. Specifically, the machine 10 may include a pump (not shown) connected to the hydraulic cylinders 15 and to the hammer assembly 20 through one or more hydraulic supply lines (not shown). The hydraulic supply system may introduce pressurized fluid, for example oil, from the pump and into the hydraulic cylinders 15 and/or the hammer assembly 20. Operator controls for movement of the hydraulic cylinders 15 and/or the hammer assembly 20 may be located within a cabin 11 of the machine 10.

The hammer assembly 20 may include a hammer 30 and a tool 25 operatively coupled to the hammer 30 opposite the stick 16. Driven by the hydraulic supply system, the hammer 30 may provide a reciprocating impact motion to the tool 25, which, in turn, may be applied to a material, such as rock or concrete, in contact with the tool 25. It is contemplated that the tool 25 may include any known tool capable of interacting with the hammer 30. In one embodiment, the tool 25 may include a chisel bit.

Figure 2:
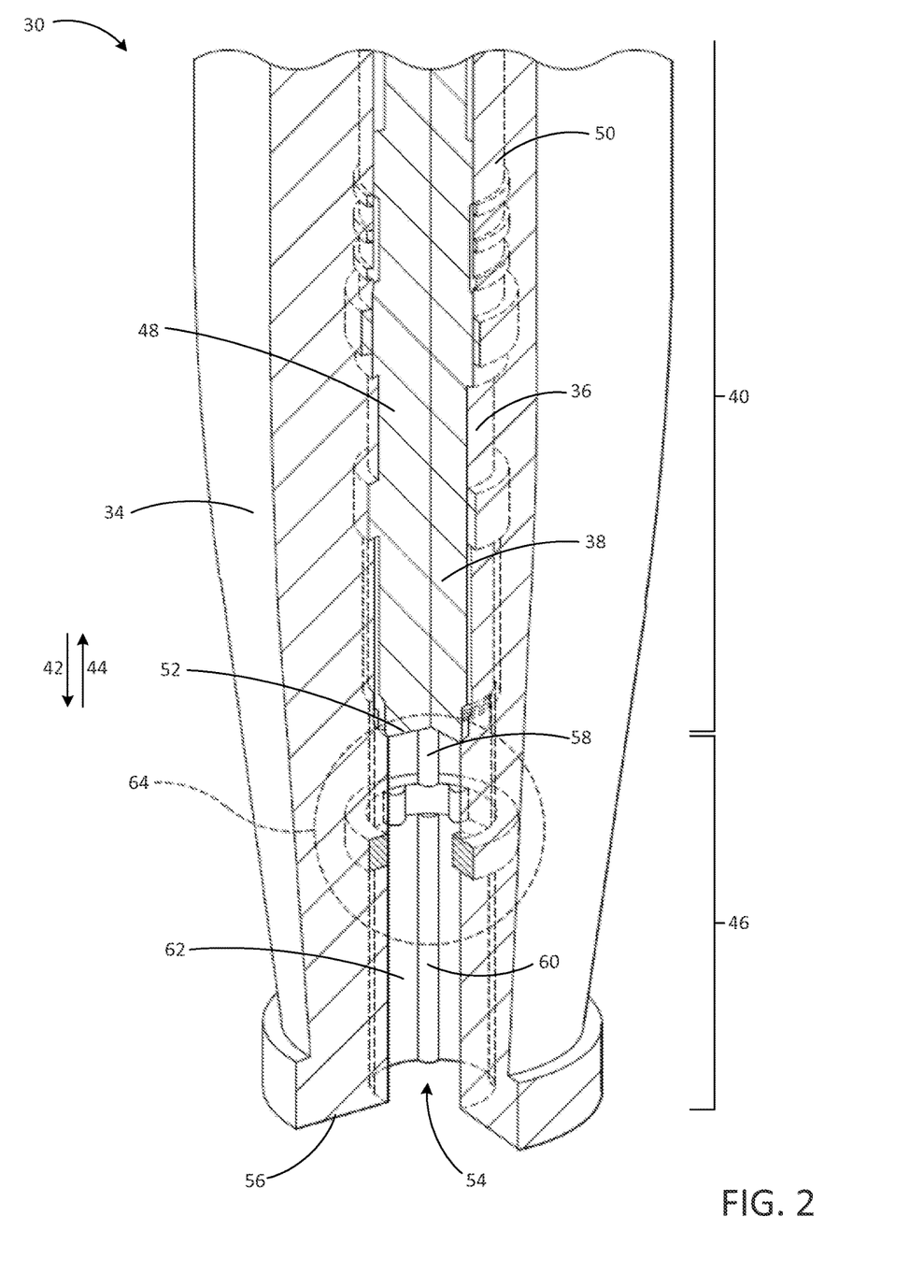
FIG. 2 illustrates a cut-away view of an exemplary hammer in accordance with aspects of the disclosure.

FIG. 2 provides a cut-away view of a portion of an exemplary hammer 30. The hammer 30 may include a housing 34 wherein a longitudinal chamber 36 may be defined. A piston 38 may be movingly disposed within an upper portion 40 of the chamber 36. In a work stroke, the piston 38 may move in the direction indicated by an arrow 42 and strike the tool 25 (FIG. 1). In a return stroke, the piston 38 may move in the direction indicated by an arrow 44. The directions indicated by the arrow 42 and the arrow 44 may generally correspond with a longitudinal axis of the hammer 30 and/or the chamber 36. A hydraulic circuit (not shown) may be operatively connected to the hydraulic supply system and may provide pressurized fluid to cause the piston 38 to alternately reciprocate in the work stroke and the return stroke. In an aspect, the piston 38 may move about 1.5 inches in a work or return stroke.

The piston 38 may be configured with a longitudinal surface 48 in movable contact with an inner surface 50 of the upper portion 40 of the chamber 36. The piston 38 may further include a bottom surface 52 that strikes the tool 25 upon a work stroke of the piston 38. The longitudinal surface 48 of the piston 38 and the inner surface of the upper portion 40 of the chamber 36 may each comprise a smooth surface.

The chamber 36 may further include a lower portion 46 wherein a portion of the tool 25 may be situated for operation of the hammer 30 and the hammer assembly 20. The lower portion 46 of the chamber 36 may longitudinally extend from the bottom surface 52 of the piston 38 to an opening 54 defined by a bottom surface 56 of the housing 34. The lower portion 46 of the chamber 36 may be configured to allow quick attachment and/or removal of the tool 25 to and/or from the hammer 30. In particular, the lower portion 46 of the chamber 36 may include a plurality of upper splines 58 and a plurality of lower splines 60 disposed on an inner surface 62 of the lower portion 46 of the chamber 36. Each upper spline 58 may longitudinally align with one of the lower splines 60. Each of the upper splines 58 and each of the lower splines 60 may be hemispherical or curve shaped. As an alternative, each of the upper splines 58 and each of the lower splines 60 may be square, trapezoid, or rectangular shaped. The lower portion 46 of the chamber 36 may include any number of upper splines 58 and a corresponding number of lower splines 60. For example, the lower portion 46 of the chamber 36 may include 4, 5, 6, 7, or 8 upper splines 58 and an equal number of lower splines 60. The upper splines 58 and lower splines 60, respectively, may be equidistantly situated around the circumference of the inner surface 62 of the lower portion 46 of the chamber 36.

The lower portion 46 of the chamber 36 may be further configured with a locking mechanism 64. The locking mechanism 64 may be configured to couple the tool 25 within the hammer 30.

Figure 3A:
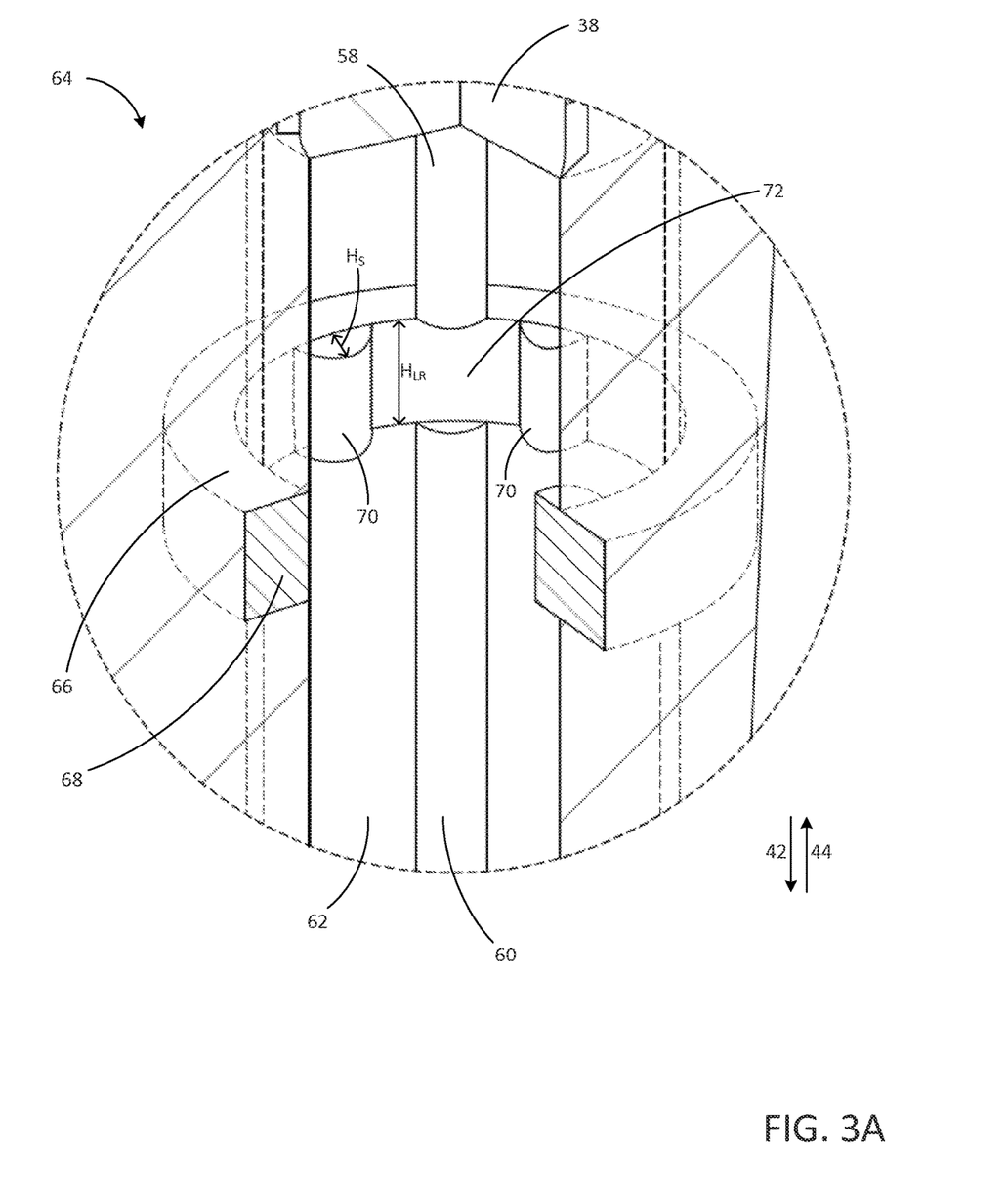
FIG. 3A illustrates an exploded cut-away view of an exemplary locking mechanism in accordance with aspects of the disclosure.
Figure 3B:
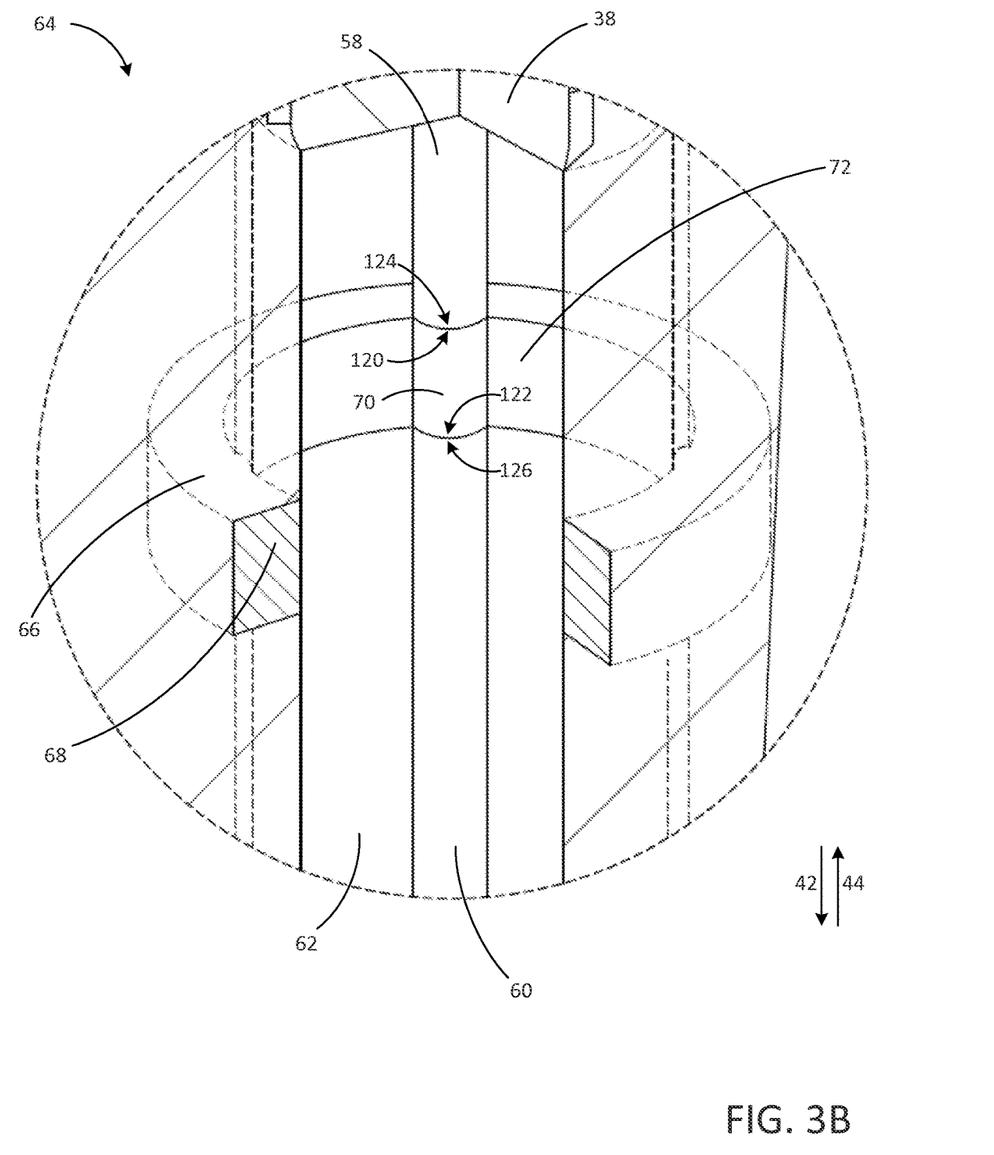
FIG. 3B illustrates an exploded cut-away view of an exemplary locking mechanism in accordance with aspects of the disclosure.

FIGS. 3A and 3B each provide an exploded cut-away view of the locking mechanism 64. As will be discussed in further detail below, FIG. 3A shows the locking mechanism 64 in a locked state in which the tool 25 is coupled to the hammer 30 and FIG. 3B shows the locking mechanism 64 in an unlocked state in which the tool 25 may be freely inserted or removed from the hammer 30.

The locking mechanism 64 may include a ring channel 66 circumferentially disposed around the inner surface 62 of the lower portion 46 of the chamber 36. A locking ring 68 may be movably positioned within the ring channel 66. The locking ring 68 may include a plurality of splines 70 disposed on an inner surface 72 of the locking ring 68. Each of the splines 70 may be oriented parallel to the general directions indicated by the arrows 42 and 44. The number, position, and shape of the splines 70 of the locking ring 68 may correspond with the upper splines 58 and the lower splines 60 of the lower portion 46 of the chamber 36. Accordingly, each of the splines 70 may be hemispherical or curve shaped. Alternatively, each of the splines 70 may be square, trapezoid, or rectangular shaped. The number of splines 70 on the locking ring 68 may be 4, 5, 6, 7, or 8 and the splines 70 may be equidistantly positioned around the circumference of the inner surface 72 of the locking ring 68.

The locking ring 68 may be rotated within the ring channel 66, such as by the machine 10 operator, to position the locking mechanism 64 from a locked position, as shown in FIG. 3A, to an unlocked position as shown in FIG. 3B, or vice versa. In a locked position, the tool 25 may be coupled with the hammer 30, such as in preparation for the operation of the hammer assembly 20 to demolish rock or concrete. In an unlocked position, the tool 25 may be de-coupled and removed from the hammer 30, such as if the tool 25 is worn out and requires replacement or exchange with a differently-configured tool 25. Since the locking mechanism 64 is positioned within the chamber 36 and the housing 34, the locking mechanism 64 may be less exposed to incidental damage or soiling caused by the inherent nature of demotion via hydraulic hammer.

Figure 4:
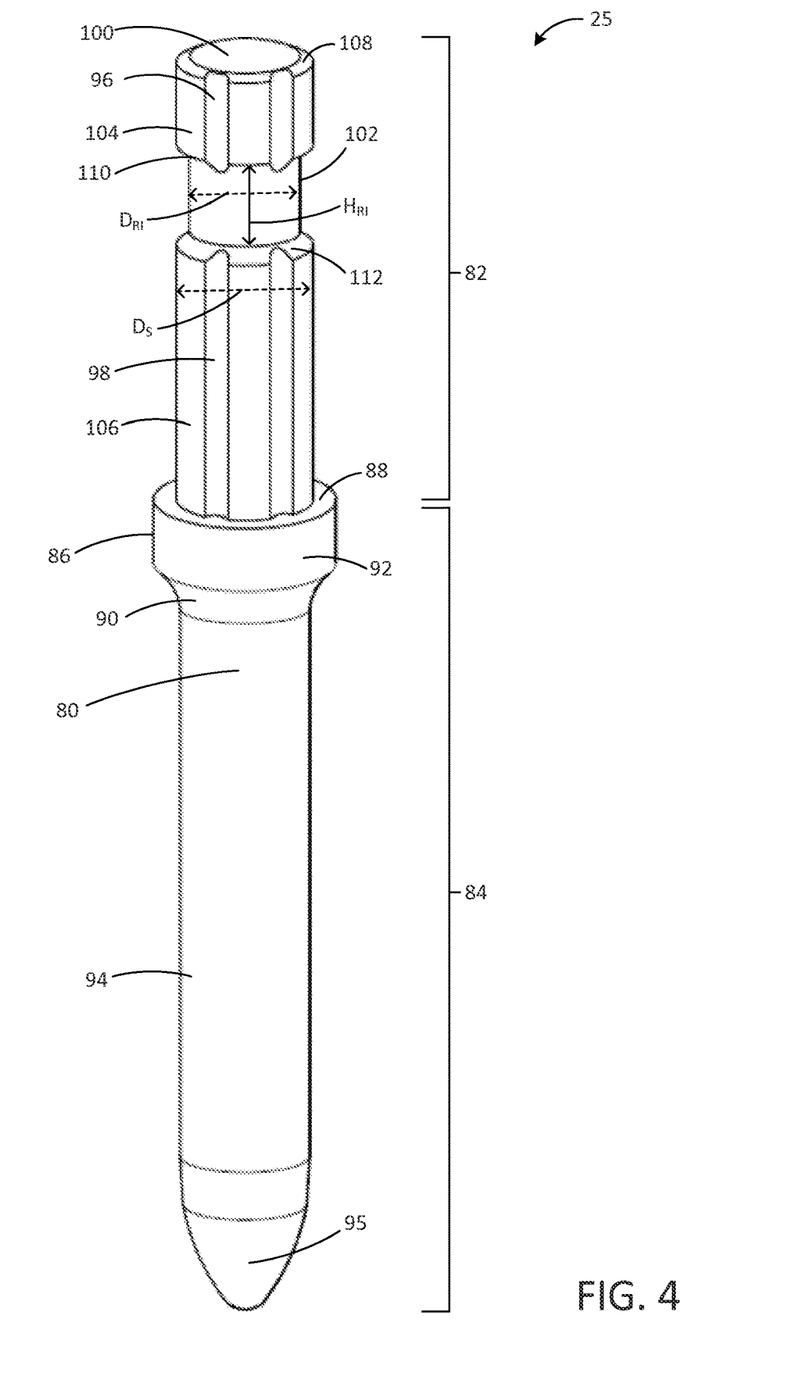
FIG. 4 illustrates an exemplary tool in accordance with aspects of the disclosure.

FIG. 4 depicts a diagram of the tool 25. The tool 25 may include a shaft 80 comprising an upper portion 82 and a lower portion 84. The upper portion 82 of the shaft 80 may generally include that portion of the tool 25 that is received by the chamber 36 of the hammer 30. Conversely, the lower portion of 82 of the shaft 80 may generally include that portion of the tool 25 that protrudes from the hammer 30 and contacts the material being demolished.

The lower portion 84 of the shaft 80 may include a stop flange 86. The stop flange 86 may be disposed along the shaft 80 at a position abutting the upper portion 82 of the shaft 80. The stop flange 86 may include an upper edge 88 and a lower edge 90 joined by a circumferential surface 92. In an aspect, the lower edge 90 may be concavely beveled. The upper edge 88 may be normal to the shaft 80. The stop flange 86 may prevent the tool 25 from receding too far into the chamber 36 of the hammer 30. For example, the stop flange 86 may be configured with a diameter larger than the diameter of the opening 54 of the hammer 30 so that contact with the upper edge 88 of the stop flange 86 and the bottom surface 56 of the hammer 30 may prevent the tool 25 from further entering the hammer 30.

The lower portion 84 of the shaft 80 may further include a tool tip 94. The tool tip 94 may serve as the contact point between the tool 25 and the material being demolished. The tool tip 94 may comprise a conical point 95, as depicted in FIG. 3, configured to break up hard material. In other aspects, the tool tip 94 may alternatively be configured with a moil point, a chisel point, a spade, or a compaction plate.

The upper portion 82 of the shaft 80 may be configured to interconnect with elements of the hammer 30 to couple the tool 25 with the hammer 30. In particular, the upper portion 82 of the shaft 80 may include a plurality of upper grooves 96 and a plurality of lower grooves 98 disposed on an upper surface 104 and a lower surface 106, respectively. The upper grooves 96 and the lower grooves 98 may be configured to receive and interconnect with the upper splines 58 and the lower splines 60, respectively, within the chamber 36 of the hammer 30. The upper grooves 96 and the lower grooves 98 may be longitudinally aligned. Since the upper grooves 96 and the lower grooves 98 may interconnect with the upper splines 58 and the lower splines 60, the number, shape, and position of the upper grooves 96 and the lower grooves 98 may correspond with the number, shape, and position of the upper splines 58 and the lower splines 60. For example, as in the embodiments depicted in FIGS. 2-4, the upper grooves 96 and the lower grooves 98 may each include a hemispherical shaped groove to securely receive each of the hemispherical shaped upper splines 58 and lower splines 60 when the tool is inserted into the chamber 36 of the hammer 30.

The upper grooves 96 may span from a top surface 100 of the tool 25 to a ring indentation 102. The top surface 100 and the upper surface 104 may be connected via a top bevel 108 and the ring indentation 102 and the upper surface 104 may be connected via an upper bevel 110. The upper grooves 96 may extend through the top bevel 108 and/or the upper bevel 110. The lower grooves 98 may span from the ring indentation 102 to the stop flange 86. The ring indentation 102 and the lower surface 106 may be connected via a lower bevel 112. The lower grooves 98 may extend through the lower bevel 112.

The ring indentation 102 may provide an indentation, with respect to the lower surface 106 and the upper surface 104, in the shaft 80 of the tool 25 that aligns with the locking ring 68 in the chamber 36 of the hammer 30. The ring indentation 102 may provide a space in which the splines 70 of the locking ring 68 are rotationally unimpeded, such as when the locking ring 68 is rotated to lock or unlock the tool 25 with the hammer 30. For example, the difference between the diameter $D_S$ of the shaft 80 at positions corresponding to the upper surface 104 and/or the lower surface 106 and the diameter $D_{RI}$ of the shaft 80 in the ring indentation 102 may be about equal or slightly more than equal to twice the height $H_S$ of the spline 70 of the locking ring 68 (i.e., the maximum distance that the spline 70 protrudes compared to the inner surface 72 of the locking ring 68 and/or the inner surface 62 of the chamber 36). The ratio of the diameter $D_{RI}$ of the shaft 80 in the ring indentation 102 to the diameter $D_S$ of the shaft 80 at positions corresponding to the upper surface 104 and/or the lower surface 106 (i.e., the unindented portions of the shaft) may be about 0.75. In an aspect, the ratio of the diameter $D_{RI}$ of the shaft 80 in the ring indentation 102 to the diameter $D_S$ of the shaft 80 at positions corresponding to the upper surface 104 and/or the lower surface 106 (i.e., the unindented portions of the shaft) may be in a range from about 13/16 to about 5/8. The height $H_{RI}$ of the ring indentation 102 may be greater than the height $H_{LR}$ of the locking ring 68 to allow limited longitudinal movement of the tool 25 when the tool 25 is struck by the piston 38. The ratio of the height $H_{LR}$ of the locking ring 68 to the height $H_{RI}$ of the ring indentation 102 may in a range from about 3/4 to about 1.

Returning to FIG. 3B, the tool 25 may be inserted into the lower portion 46 of the chamber 36 of the hammer 30 and/or removed from the lower portion 46 of the chamber 36 of the hammer 30 while the locking mechanism 64 is in the unlocked state. When in the unlocked state, the locking ring 68 may be rotationally positioned in the ring channel 66 so that the splines 70 of the locking ring 68 align with the upper splines 58 and the lower splines 60 of the chamber 36, thereby allowing each of the lower splines 60, the splines 70, and the upper splines 58 to be received by the upper grooves 96 and lower grooves 98 as the tool 25 is inserted into the chamber 36. Particularly, an upper edge 120 of the spline 70 may be aligned with a lower edge 124 of the upper spline 58 and a lower edge 122 of the spline 70 may be aligned with an upper edge 126 of the lower spline 60. The upper edge 120 of the spline 70 may be flush with the lower edge 124 of the upper spline 58 and/or the lower edge 122 of the spline 70 may be flush with the upper edge 126 of the lower spline 60.

Turning to FIG. 3A, the locking mechanism 64 may be put into a locked state, such as upon the tool 25 being inserted into the chamber 36 of the hammer 30 as described above. In particular, the locking ring 68 may be rotated within the ring channel 66 so that the splines 70 of the locking ring 68 are misaligned with the upper splines 58 and the lower splines 60 of the chamber 36 of the hammer 30, thereby misaligning the splines 70 of the locking ring 68 with the upper grooves 96 and lower grooves 98 of the tool 25. For example, the locking ring 68 may be rotated so that each of the splines 70 of the locking ring 68 are circumferentially positioned about halfway between each of the upper splines 58 and the lower splines 60 of the chamber 36. In this position, the tool 25 may be retained by the hammer 30 due to the now-misaligned splines 70 of the locking ring 68 contacting the edge (e.g., the upper bevel 110) of the upper surface 104 and/or the edge (e.g., the lower bevel 112) of the lower surface 106. As noted above, the tool 25 and the hammer 30 may be configured—for example the height $H_{RI}$ of the ring indentation 102 and the height $H_{LR}$ of the locking ring 68—to allow some measure of longitudinal movement of the tool 25 within the hammer 30 while still securing the tool 25.

Figure 5A:
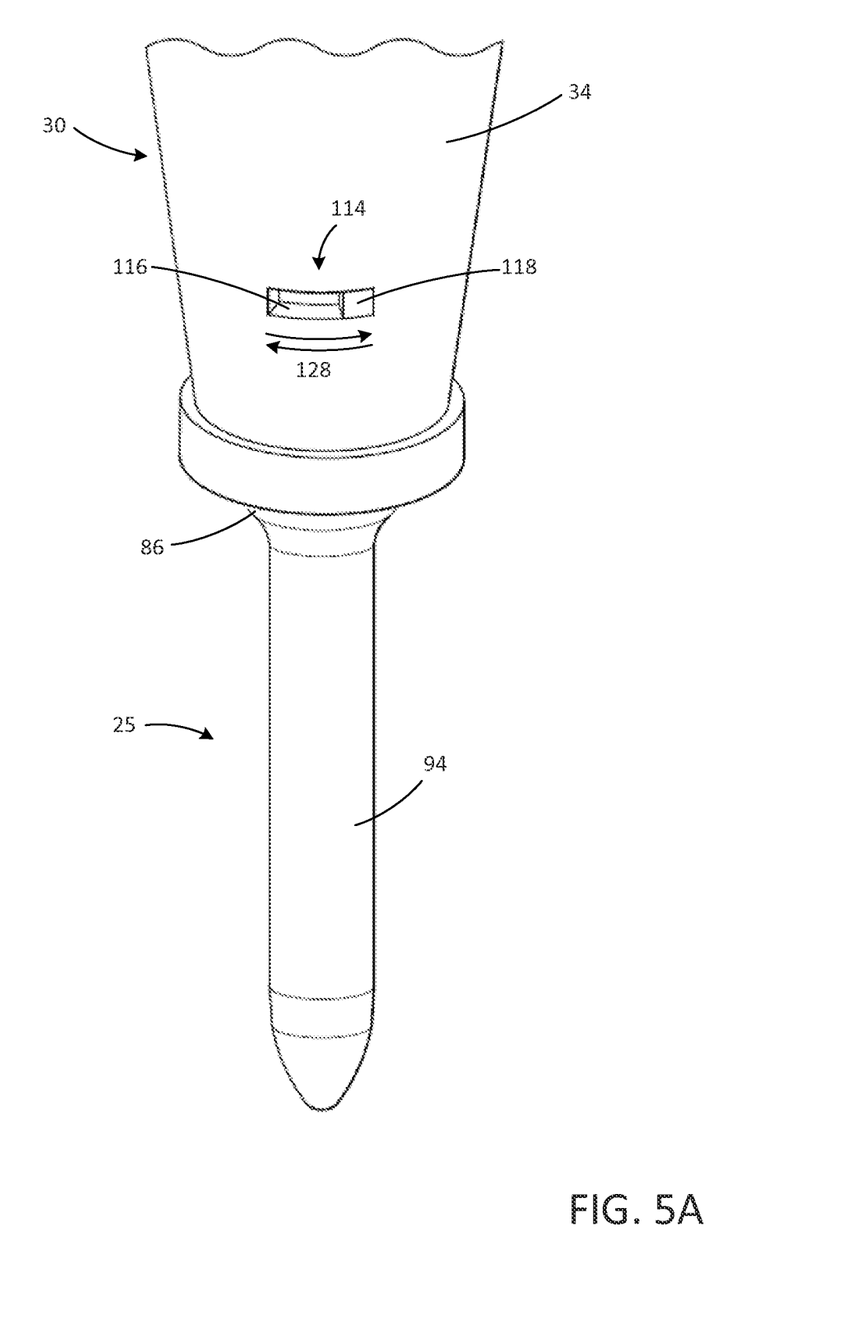
FIG. 5A illustrates an exemplary hammer coupled with an exemplary tool in accordance with aspects of the disclosure.
Figure 5B:
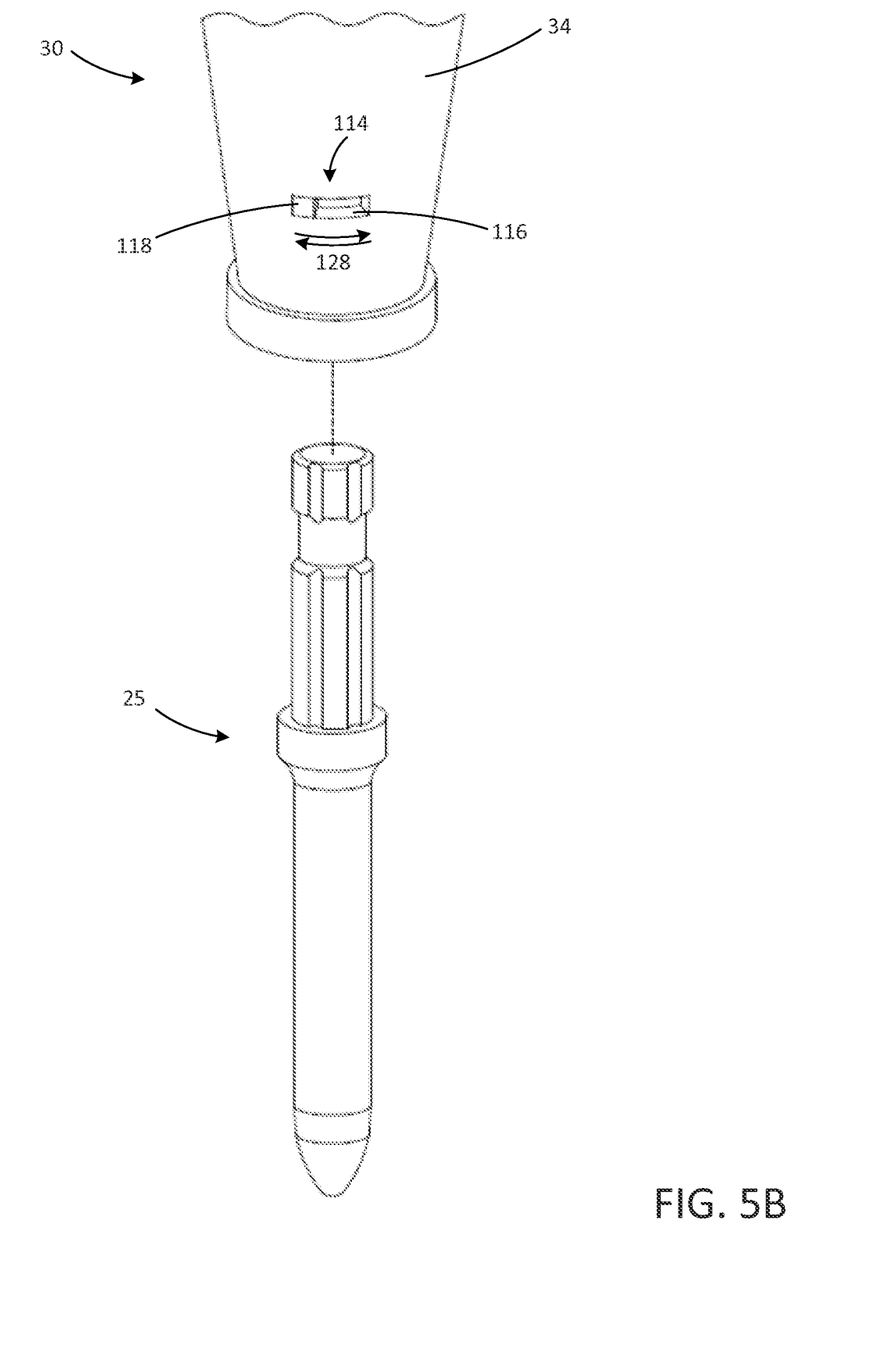
FIG. 5B illustrates an exemplary hammer de-coupled from an exemplary tool in accordance with aspects of the disclosure.

FIGS. 5A and 5B each depict an external view of the hammer 30 and the tool 25. In FIG. 5A, the tool 25 has been inserted into and is retained by the hammer 30. The upper portion 82 (not visible) of the shaft 80 of the tool 25 is disposed within the chamber 36 of the hammer 30 and the lower portion 84 of the shaft 80, including the stop flange 86 and the tool tip 94, protrudes from the hammer 30. The locking mechanism 64 of the hammer 30 may be put into a locked state, such as by an operator, via an interface mechanism 114 disposed within the housing 34 of the hammer 30. The interface mechanism 114 may include a slot 116 or other opening accessible from the exterior of the housing 34. A movable grip 118 may be disposed within the slot 116. The grip 118 may be operatively connected to the locking ring 68. In an aspect, the grip 118 may be formed as part of the locking ring 68. In operation, an operator may move, such as with a finger, the grip 118 within the slot 116 in one of the directions indicated by the arrows 128 to a locked position. As the grip 118 is moved within the slot 116 to the locked position, the locking ring 68 may correspondingly move from an unlocked state, as depicted in FIG. 3B, to a locked state, as depicted in FIG. 3A. In some aspects, the grip 118 may include a recess in which an operator may insert one or several fingers and which may provide a point of leverage for the operator to manipulate the interface mechanism 114. In other aspects, the grip 118 may include a knob or lever that the operator may grasp or push against to manipulate the interface mechanism 114. The interface mechanism 114 may allow the operator to insert and/or remove the tool 25 from the hammer 30 without additional tools or equipment.

In FIG. 5B, the tool 25 is decoupled from the hammer 30. To decouple (or insert) the tool 25 from the hammer 30, the grip 118 may be moved in the slot 116, such as in one of the directions indicated by the arrows 128 opposite that used to lock the locking mechanism 64, to an unlocked position. As the grip 118 is moved in the slot 116 to the unlocked position, the locking ring 68 may correspondingly move to an unlocked state, as depicted in FIG. 3B.

The disclosed hammer 30 and tool 25, including the disclosed locking mechanism 64, may be manufactured using conventional techniques, such as, for example, casting or molding. Alternatively, the disclosed tool 25 and/or locking mechanism 64 may be manufactured using conventional techniques generally referred to as additive manufacturing or additive fabrication. Known additive manufacturing/fabrication processes include techniques, such as, for example, 3D printing. 3D printing is a process in which material may be deposited in successive layers under the control of a computer. The computer controls additive fabrication equipment to deposit the successive layers according to a three-dimensional model (e.g., a digital file, such as an AMF or STL file) that is configured to be converted into a plurality of slices, for example, substantially two-dimensional slices, that each define a cross-sectional layer of the tool 25 and/or locking mechanism 64 in order to manufacture, or fabricate, the tool 25 and/or locking mechanism 64. In one instance, the disclosed tool 25 and/or locking mechanism 64 would be an original component, and the 3D printing process would be utilized to manufacture the tool 25 and/or locking 64 mechanism. In other instances, the 3D process could be used to replicate an existing tool 25 and/or locking mechanism 64, and the replicated tools 25 and/or locking mechanisms 64 could be sold as aftermarket parts. These replicated aftermarket tools 25 and/or locking mechanisms 64 could be either exact copies of the original tool 25 and/or locking mechanism 64 or pseudo copies differing in only non-critical aspects.

Figure 6:
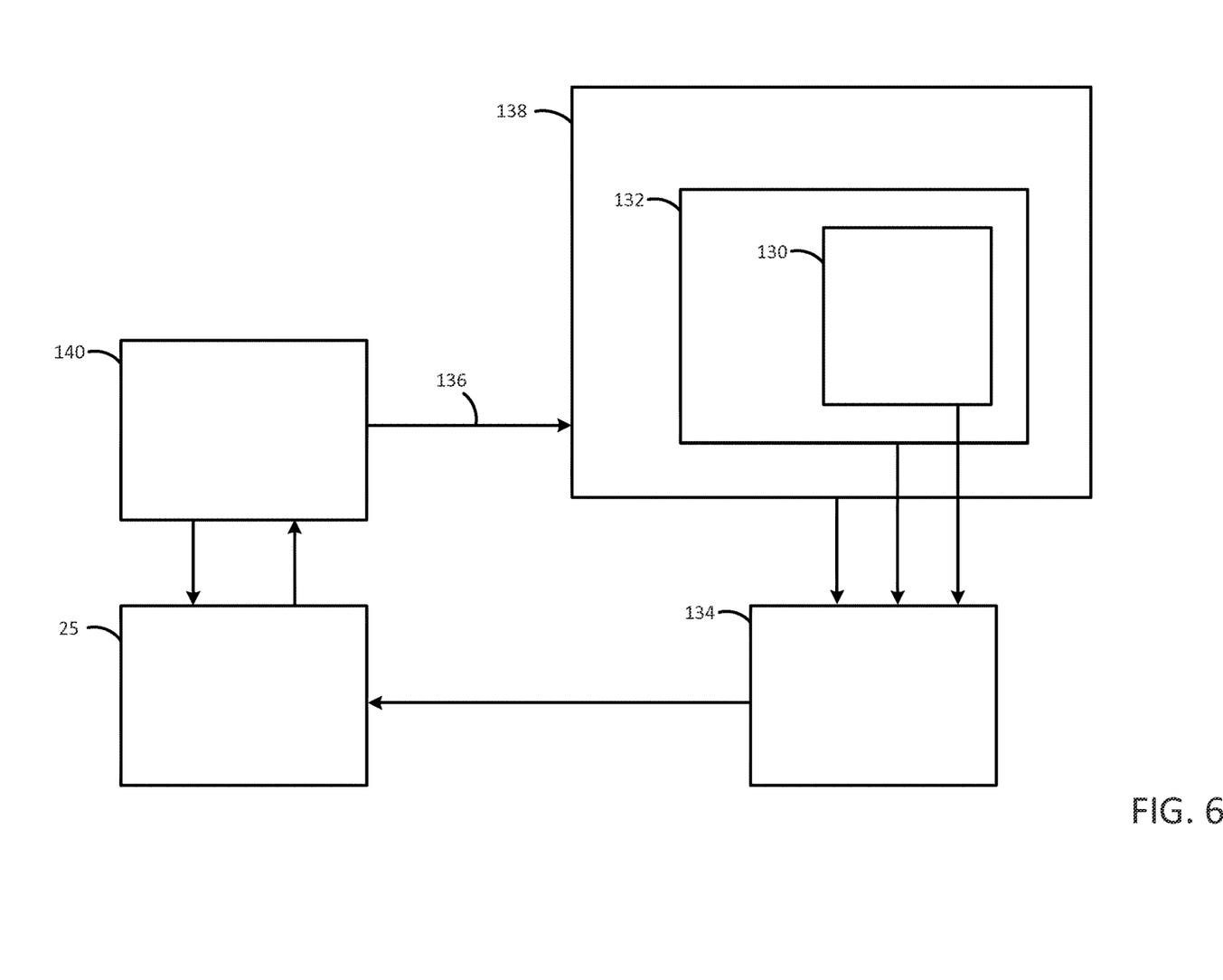
FIG. 6 illustrates a schematic diagram of an exemplary system for generating a three-dimensional model of a tool and/or locking mechanism.

With reference to FIG. 6, the three-dimensional model 130 used to represent an original tool 25 and/or locking mechanism 64 may be on a computer-readable storage medium 132, such as, for example, magnetic storage including floppy disk, hard disk, or magnetic tape; semiconductor storage such as solid state disk (SSD) or flash memory; optical disc storage; magneto-optical disc storage; or any other type of physical memory on which information or data readable by at least one processor may be stored. This storage medium 132 may be used in connection with commercially available 3D printers 134 to manufacture, or fabricate, the tool 25 and/or locking mechanism 64. Alternatively, the three-dimensional model 130 may be transmitted electronically to the 3D printer 134 in a streaming fashion without being permanently stored at the location of the 3D printer 134. In either instance, the three-dimensional model 130 constitutes a digital representation of the tool 25 and/or locking mechanism 64 suitable for use in manufacturing the tool 25 and/or locking mechanism 64.

The three-dimensional model 130 may be formed in a number of known ways. In general, the three-dimensional model 130 is created by inputting data 136 representing the tool 25 and/or locking mechanism 64 to a computer or a processor 138, such as a cloud-based software operating system. The data 136 may then be used as a three-dimensional model representing the physical tool 25 and/or locking mechanism 64. The three-dimensional model 130 is configured to be suitable for the purposes of manufacturing the tool 25 and/or locking mechanism 64. In an exemplary embodiment, the three-dimensional model 130 is suitable for the purpose of manufacturing the tool 25 and/or locking mechanism 64 by an additive manufacturing technique.

In the exemplary embodiment shown in FIG. 6, the inputting of data may be achieved with a 3D scanner 140. The method may involve contacting the tool 25 and/or locking mechanism 64 via a contacting and data receiving device, and receiving data from the contacting in order to generate the three-dimensional model. For example, the 3D scanner 140 may be a contact-type scanner. The scanned data may be imported into a 3D modeling software program to prepare a digital data set. In some embodiments, the contacting may occur via direct physical contact using a coordinate measuring machine that measures the physical structure of the tool 25 and/or locking mechanism 64 by contacting a probe with the surfaces of the tool 25 and/or locking mechanism 64 in order to generate a three-dimensional model. In other embodiments, the 3D scanner 140 may be a noncontact type scanner, and the method may include directing projected energy (e.g., light or ultrasonic energy) onto the tool 25 and/or locking mechanism 64 to be replicated and receiving the reflected energy. From this reflected energy, a computer may be used to generate a computer-readable three-dimensional model for use in manufacturing the tool 25 and/or locking mechanism 64. In various embodiments, multiple two-dimensional images may be used to create a three-dimensional model. For example, 2D slices of a 3D object may be combined to create the three-dimensional model 130. In lieu of a 3D scanner, the inputting of data may be performed using computer-aided design (CAD) software. In such instances, the three-dimensional model 130 may be formed by generating a virtual 3D model of the disclosed tool 25 and/or locking mechanism 64 using the CAD software. A three-dimensional model may be generated from the CAD virtual 3D model in order to manufacture the tool 25 and/or locking mechanism 64.

The additive manufacturing process utilized to create the disclosed tool 25 and/or locking mechanism 64 may involve materials, such as, for example, plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes.

INDUSTRIAL APPLICABILITY

Referring to FIGS. 1-6, the industrial applicability of the system configured to couple a hydraulic hammer and tool described herein will be readily appreciated from the foregoing discussion. The hammer assembly 20, including the hammer 30 and tool 25, described herein may be used in conjunction with a variety of machines, including an excavator or a backhoe loader. The hammer assembly 20 may be used, for example, to break apart or demolish structures composed of a variety of hard materials, such as rock, concrete, or asphalt.

According to some embodiments of the hammer assembly 20, the hammer 30 and the tool 25 may each be configured to facilitate a quick and low-effort coupling and/or decoupling of the hammer 30 and the tool 25. For example, since the tool 25 is used to strike the material being demolished, the tool 25 may experience significant wear and require replacement at the worksite with a fresh tool 25. In addition, the tool 25 configured with one type of tool tip 94 (e.g., a chisel point) may be swapped for another tool 25 with a different type of tool tip 94 (e.g., a compaction plate) according to the changing needs of the job. In some aspects, the hammer 30 and the tool 25 may be coupled and/or decoupled 25 without additional tools or equipment.

In particular, the chamber 36 of the hammer 30 may be include the upper splines 58 and the lower splines 60 configured to interconnect with the upper grooves 96 and lower grooves 98 of the tool 25. The interconnection of the grooves and splines may prevent the tool 25 from rotating within the chamber 36. The chamber 36 of the hammer 30 may further include the locking mechanism 64 configured to retain the tool 25 within the hammer 30 while the hammer assembly 20 is in operation. The locking mechanism 64 may include the locking ring 68 configured with the splines 70. The locking ring 68 may be rotated to an unlocked state in which the splines 70 of the locking ring 68 are aligned with the upper splines 58 and the lower splines 60 of the chamber 36 of the hammer 30. The operator may manipulate the interface mechanism 114 accessible from the exterior of the hammer 30 to rotate the locking ring 68 to the unlocked state. While the locking ring 68 is in an unlocked state, the tool 25 may be inserted into the chamber 36 of the hammer 30.

When the operator has inserted the tool 25 into the chamber 36 of the hammer 30, the locking ring 68 may be rotated to a locked state in which the tool 25 is securely coupled with the hammer 30. The operator may again manipulate the interface mechanism 114 to rotate the locking ring 68 into the locked state. In the locked state, the splines 70 of the locking ring 68 are misaligned with the upper splines 58 and the lower splines 60 of the chamber 36 of the hammer 30 and, thus, also misaligned with the upper grooves 96 and lower grooves 98 of the inserted tool 25. Due to the misalignment, the splines 70 of the locking ring 68 may contact the respective edges of the upper surface 104 and lower surface 106 of the tool and prevent the undesirable longitudinal movement of the tool 25. In this manner, the tool 25 may be retained within the chamber 36 of the hammer 30 and, therefore, operatively coupled with the hammer 30.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

I claim:

1. A hydraulic hammer comprising:
    a housing defining a chamber, elongate along a longitudinal axis, configured to receive a tool, the chamber comprising an opening through which the tool is configured to be inserted;
    a plurality of upper splines disposed on an inner surface of the chamber, the plurality of upper splines longitudinally oriented parallel to the longitudinal axis;
    a plurality of lower splines disposed on the inner surface of the chamber, the plurality of lower splines longitudinally oriented parallel to the longitudinal axis; and
    a locking mechanism disposed within the chamber between the plurality of upper splines and the plurality of lower splines, the locking mechanism comprising a locking ring that is rotatable about the longitudinal axis with respect to the housing, the locking ring comprising a plurality of locking ring splines disposed on an inner surface of the locking ring, wherein the hydraulic hammer defines an unlocked state in which the plurality of locking ring splines are configured to align with both the plurality of upper splines and the plurality of lower splines.

2. The hydraulic hammer of claim 1, wherein each of the plurality of upper splines abuts a reciprocating piston of the hydraulic hammer during a work stroke of the reciprocating piston and each of the plurality of upper splines abuts the locking ring.

3. The hydraulic hammer of claim 1, wherein each of the plurality of lower splines abuts the locking ring.

4. The hydraulic hammer of claim 1, wherein one of more splines of the plurality of upper splines, plurality of lower splines, or locking ring splines is hemispherical shaped.

5. The hydraulic hammer of claim 1, wherein an upper edge of each of the plurality of locking ring splines abuts a lower edge of each of the plurality of upper splines and a lower edge of each of the plurality of locking ring splines abuts an upper edge of each of the plurality of lower splines.

6. The hydraulic hammer of claim 1, further comprising:
    an interface mechanism configured to allow manipulation of the locking ring, the interface mechanism comprising:
        a slot defined in the housing; and
        a grip member movable within the slot and operatively connected to the locking ring such that movement of the grip member causes rotation of the locking ring.

7. The hydraulic hammer of claim 6, wherein the slot is open to an exterior of the housing.

8. An assembly configured to couple a hydraulic hammer and a tool, the assembly comprising:
    a chamber, elongate along a longitudinal axis, defined in a housing of the hydraulic hammer, the chamber comprising an opening through which the tool is configured to be inserted;
    a plurality of upper splines disposed on an inner surface of the chamber, the plurality of upper splines longitudinally oriented parallel to the longitudinal axis;
    a plurality of lower splines disposed on the inner surface of the chamber, the plurality of lower splines longitudinally oriented parallel to the longitudinal axis; and
    a locking mechanism disposed within the chamber between the plurality of upper splines and the plurality of lower splines, the locking mechanism comprising a rotatable locking ring, the locking ring comprising a plurality of locking ring splines disposed on an inner surface of the locking ring, wherein the plurality of locking ring splines are configured to align with the plurality of chamber splines when the locking ring is rotated to an unlocked state.

9. The assembly of claim 8, wherein each of the plurality of upper splines abuts a reciprocating piston of the hydraulic hammer during a work stroke of the reciprocating piston and each of the plurality of upper splines abuts the locking ring.

10. The assembly of claim 8, wherein each of the plurality of lower splines abuts the locking ring.

11. The assembly of claim 8, wherein one of more splines of the plurality of upper splines, plurality of lower splines, or locking ring splines is hemispherical shaped.

12. The assembly of claim 8, wherein an upper edge of each of the plurality of locking ring splines abuts a lower edge of each of the plurality of upper splines and a lower edge of each of the plurality of locking ring splines abuts an upper edge of each of the plurality of lower splines.

13. The assembly of claim 8, further comprising:
    a grip member operatively connected to the locking ring such that a manipulation of the grip member causes rotation of the locking ring.

14. The assembly of claim 13, wherein the grip member is accessible from an exterior of the housing.

* * * * *